United States Patent [19]

DeGroot

[11] Patent Number: 5,349,440
[45] Date of Patent: Sep. 20, 1994

[54] INTERFEROMETRIC LASER PROFILOMETER INCLUDING A MULTIMODE LASER DIODE EMITTING A RANGE OF STABLE WAVELENGTHS

[75] Inventor: Peter DeGroot, Bellevue, Wash.

[73] Assignee: Hughes Aircraft Company, Los Angeles, Calif.

[21] Appl. No.: 927,047

[22] Filed: Aug. 7, 1992

Related U.S. Application Data

[63] Continuation of Ser. No. 652,698, Feb. 8, 1991, abandoned.

[51] Int. Cl.$^5$ .............................................. G01B 9/02
[52] U.S. Cl. ................................. 356/349; 356/357; 356/360
[58] Field of Search ............... 356/349, 357, 355, 359, 356/360

[56] References Cited

U.S. PATENT DOCUMENTS 5,153,669  10/1992  DeGroot ............................ 356/360

OTHER PUBLICATIONS

"Two-Wavelength Speckle Interferometry on Rough Surfaces Using a More Hopping Diode Laser", Fercher, Optics & Lasers in Engineering, 1989, 271–279.
"Absolute Optical Ranging with 200-nm Resolution", Williams et al, Optics Letters, Jun. 1989, 542–544.

Primary Examiner—Samuel A. Turner
Attorney, Agent, or Firm—Michael W. Sales; Wanda K. Densen-Low

[57] ABSTRACT

Metrology method and apparatus (10) for determining a characteristic of an object's surface. The apparatus includes a multiple wavelength source (12) having an optical output. The source is comprised of a multimode laser diode (18) for simultaneously providing a plurality of wavelengths from which a synthetic wavelength is derived for metrology purposes. The apparatus further includes a beamsplitter (30), preferably a polarizing beam splitter, coupled to the optical output for providing a reference beam (32) and a measurement beam (34), the measurement beam impinging on the surface and the reference beam being phase modulated. The apparatus also includes optical elements and devices for detecting a phase difference between the reference beam and a reflected measurement beam for determining the characteristic of the surface. A diffraction grating (60) is blazed for a nominal characteristic output of the laser diode, such as 785 nanometers, and spatially resolves the various wavelengths of the returned laser light. The resolved wavelengths are provided as two beams by a lens system (62) and are detected by a pair of photodetectors (64, 66). A data processor (68) coupled to an output of the photodetectors determines an interferometric phase at the two wavelengths and the surface characteristic.

5 Claims, 2 Drawing Sheets

INTERFEROMETRIC LASER PROFILOMETER INCLUDING A MULTIMODE LASER DIODE EMITTING A RANGE OF STABLE WAVELENGTHS

This is a continuation of application Ser. No. 07/652,698 filed Feb. 8, 1991, now abandoned.

FIELD OF THE INVENTION

This invention relates generally to optical metrology and, in particular, to a synthetic wavelength interferometer including a multimode laser diode employed for profiling surfaces.

BACKGROUND OF THE INVENTION

Visible-wavelength interferometers are widely employed for high precision displacement measurement and surface profilometry. However, a well-known problem with these instruments relates to the interface phase ambiguity. In that the speckle pattern generated by visible laser light on a rough surface has an essentially random phase content with a standard deviation larger than $2\pi$, conventional interferometry does not normally yield any useful information about the profile of a rough surface. As a result, mechanical gauges are often used in place of interferometers in precision machining, inspection and optics manufacture. However, it is not always desirable or physically possible to mechanically contact a surface in order to perform a profile measurement.

One known method to extend the range of metrology applications for interferometry is to measure the interferometric phase at two distinct wavelengths. The difference between the two phase measurements corresponds to a synthetic wavelength ($\Lambda$) given by $$\Lambda = \lambda_1 \lambda_2 / (\lambda_2 - \lambda_1)$$

where $\lambda_1$ and $\lambda_2$ are the two distinct optical wavelengths. In that the synthetic wavelength may be very large, compared to visible-light wavelengths, it is possible to accommodate profile discontinuities and surface roughness that would be beyond the capability of a conventional interferometer.

As described in U.S. Pat. No. 4,832,489, issued May 23, 1989, to J. C. Wyant et al., a two-wavelength phase-shifting interferometer employs two laser sources for reconstructing steep surface profiles, such as aspheric surfaces. A 256×256 detector array is used and the technique computes an equivalent phase independently for each detector.

The following articles discuss various aspects of employing a synthetic wavelength for surface profilometry.

In an article entitled "Contouring Aspheric Surfaces Using Two-Wavelength Phase-Shifting Interferometry" by K. Creath, Y. Cheng, and J. Wyant, Optica Acta, 1985, Vol. 32, No. 12, 1455-1464 there is described two-wavelength holography using an argon-ion laser and a He-Ne laser. An uncoated aspheric surface was placed in one arm of an interferometer and synthetic wavelengths of 2.13 micrometers and 2.75 micrometers were employed. Interferograms were recorded using a 100×100 diode array. Primary interferograms were manipulated by a computer to produce a secondary interferogram from double-exposure measurements.

In an article entitled "Absolute Optical Ranging with 200-nm Resolution" by C. Williams and H. Wickramasinghe, Optics Letters, Vol. 14, No. 11, Jun. 1, 1989 there is described optical ranging by wavelength-multiplexed interferometry and surface profiling said to be carried out on an integrated circuit structure. A pair of GaAlAs single-mode diode lasers are used as optical sources.

In an article entitled "Two-wavelength scanning spot interferometer using single-frequency diode lasers" by A. J. de Boef, Appl. Opt., Vol. 27, No. 2, Jan. 15, 1988 (306-311) there is described the use of two single frequency laser diodes to measure the profile of a rough surface. The two wavelengths are not time-multiplexed but are instead continuously present.

In an article entitled "Two-Wavelength Speckle Interferometry on Rough Surfaces Using a Mode Hopping Diode Laser" by A. Fercher, U. Vry and W. Werner, Optics and Lasers in Engineering 11, (1989) pages 271-279 there is described a time-multiplexed two-wavelength source consisting of a single mode diode that is switched between two adjacent oscillation modes. The switching is accomplished by pump-current modulation with the diode thermally tuned to a region near a so-called "mode hop", that is, near a region where the diode output readily switches from one wavelength output to another. This technique is said to have enabled the profiling of a ground lens surface having an estimated surface roughness of four micrometers.

These authors report that if the standard deviation of the surface profile is larger than the single wavelengths a fully developed speckle field is obtained. Amplitudes and phases of the speckle field are determined by the microscopic structure of the reflecting surface, but no deterministic relationship exists between the phases of the single-wavelength interferograms and the surface or the distance to be measured. If, however, two wavelengths are used the phase difference between the corresponding speckle fields contains not only information about the microscopic surface roughness but also about the macroscopic surface profile or distances. This information is accurate provided the standard deviation of the microscopic surface profile is smaller than the effective wavelength.

However, single-mode diodes, such as those described in certain of the above referenced articles, must typically be burned-in and carefully characterized in a monitored environment, especially if controlled switching between oscillation modes is required. Although multiple wavelength interferometry is a known technique with many applications relevant to modern metrology problems, its use is not widespread due, in part, to a difficulty in obtaining practical, reliable and inexpensive multiple-wavelength sources and detectors.

It is thus an object of the invention to provide apparatus to accomplish profilometry by exploiting a multimode behavior of a relatively inexpensive multimode laser diode.

It is a further object of the invention to provide apparatus to accomplish rough surface profilometry that avoids the use of single-mode laser diodes and/or a requirement that two wavelengths be time-multiplexed.

SUMMARY OF THE INVENTION

The foregoing and other problems are overcome and the objects of the invention are realized by method and apparatus to accomplish rough surface profilometry by employing a multimode laser diode. The profilometer uses a multimode diode laser that oscillates simultaneously at a number of discrete wavelengths, thus continuously providing a range of stable synthetic wavelengths. The spectral behavior of a strongly multimode laser diode is predictable, is free of mode hopping, and does not change appreciably with time or temperature, thereby overcoming problems experienced with the prior art techniques. In accordance with the invention there is provided metrology apparatus for determining a characteristic of a surface. The apparatus includes a multiple wavelength source having an optical output. In a preferred embodiment of the apparatus the source includes a multimode laser diode for simultaneously providing a plurality of wavelengths from which a synthetic wavelength is derived for metrology purposes. The apparatus further includes a beamsplitter, preferably a polarizing beam splitter, coupled to the optical output for providing a reference beam and a measurement beam, the measurement beam impinging on the surface to be characterized and the reference beam being phase modulated. The apparatus also includes optical elements and devices for detecting a phase difference between the reference beam and a reflected measurement beam for determining a characteristic of the surface. A diffraction grating is blazed for a nominal characteristic output of the laser diode, such as 785 nanometers, and spatially resolves the various wavelengths of the returned laser light. The resolved wavelengths are provided as two beams by a lens system and are detected by a pair of photodetectors.

A data processor coupled to an output of the photodetectors determines an interferometric phase at the two wavelengths. The computed phase difference is multiplied by $\lambda/\pi$ to calculate an absolute distance to the surface within an interval of size $\lambda/2$. A figure profile of the surface of object is generated by recording a pair of measurements and then translating the surface relative to the measurement beam.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
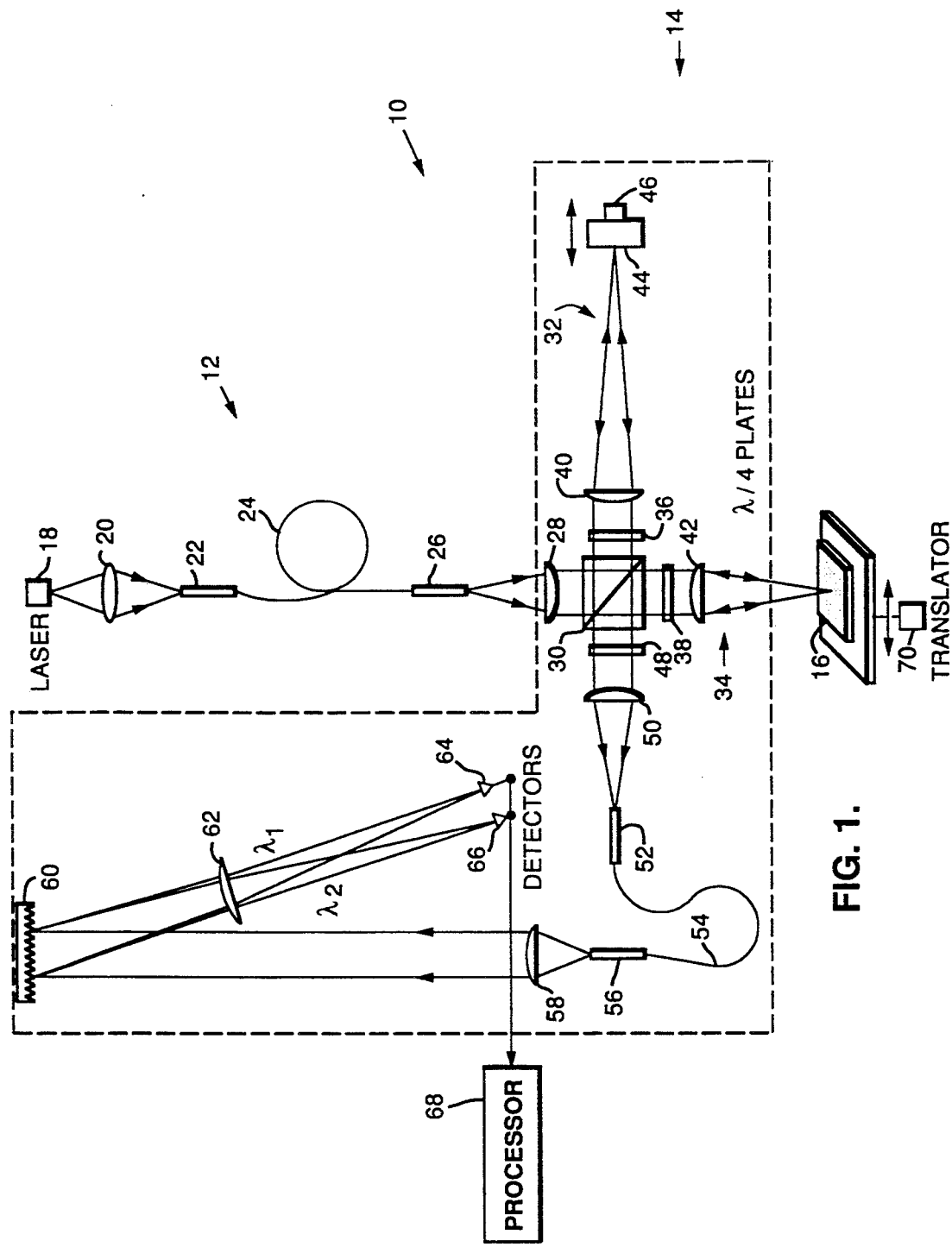
FIG. 1 is schematic diagram showing the synthetic wavelength profilometer of the invention.

Referring to FIG. 1 there is shown a two-wavelength interferometer apparatus 10 operated to determine a characteristic, such as a displacement or a roughness, of a non-specular surface. Apparatus 10 includes an optical source 12 coupled to a phase-modulated, two-beam interferometer 14 for measuring the surface characteristic of an object 16. Source 12 is comprised of a multimode laser diode 18. One suitable multimode laser diode is manufactured by Sharp and is known as a LTO23MDO device. Such a multimode laser diode oscillates simultaneously at a number of discrete wavelengths, thus continuously providing a range of stable synthetic wavelengths. The spectral behavior of the multimode laser diode 18 is predictable, is free of mode hopping, and does not change appreciably with time or temperature. For this embodiment a nominal wavelength of the laser diode 18 is approximately 785 nanometers. Two wavelengths having a minimum separation of approximately three Angstroms are selected to provide the synthetic wavelength. For the illustrated embodiment the synthetic wavelength is approximately 620 micrometers. Temperature control of the multimode laser diode 18 to 0.1C has been found to be adequate for stabilizing the output optical spectrum.

An optical isolator (not shown) protects the laser diode 18 from receiving back-reflections. A lens element 20 focuses the output of the laser diode 18 onto an input coupler 22 of an optical fiber 24. Optical fiber 24 is preferably a single mode fiber that provides filtering for ensuring that the source beam is spatially coherent. The use of optical fiber 24 also permits the interferometer 14 to be disposed remotely from the source 12. An optical fiber output coupler 26 provides the spatially coherent, multimode beam to a collimating lens system 28. The interferometer 14 includes a polarizing beamsplitter 30 which provides a reference beam 32 and a measurement or object beam 34. The beams 32 and 34 are orthogonally polarized one to another upon leaving the beamsplitter 30, a known technique employed for improving efficiency of the interferometer. Each of the beams 32 and 34 pass through a quarter wavelength plate 36 and 38, respectively, for rotating the polarization of the beams. Plates 36 and 38 are each disposed for providing their respective beams to focusing lens systems 40 and 42, respectively. The reference beam path 32 includes a phase modulating element including a mirror 44 coupled to a piezoelectric actuator 46. The actuator 46 dithers the mirror 44 over a displacement of approximately 0.5 micrometers at a rate within the range of approximately 1–1000 Hz and provides phase modulation to the multimode reference beam. In other embodiments of the invention an optoelectronic device such as a Kerr cell may be employed to impart a phase modulation to the reference beam 32.

Laser light reflecting from the mirror 44 and from the surface of the object 16 is provided, via the quarter wave plates 36 and 38 and beamsplitter 30, to a polarizer 48 disposed in front of a focusing lens system 50. Polarizer 48 functions to collapse the differently polarized reference and object beams onto a common polarization. Lens system 50 provides for injecting the measurement and reference beams into an input coupler 52 of a second optical fiber 54. An output coupler 56 of the optical optic 54 has a collimating optical element 58 disposed at an output thereof. The second optical fiber 54 functions to spatially filter the speckle interference pattern and provides an approximately spherical wavefront to the combined beams passing therethrough. The various wavelengths of the returned laser light are resolved spatially by a diffraction grating 60 and provided to a lens system 62 that focuses two distinct wavelengths $\lambda_1$ and $\lambda_2$ upon photodetectors 64 and 66. In the illustrated embodiment the grating 60 is blazed for a wavelength of 785 nanometers. $\lambda_1$ and $\lambda_2$ are spaced approximately 1.1 nanometers apart in the multimode spectrum.

A data processor 68 is coupled to an output of the detectors 64 and 66 and determines an interferometric phase at these two wavelengths. To this end a 5-point, phase-demodulating algorithm of a type described by P. Hariharan, B. F. Oreb and T. Eiju, Appl. Opt. 26 2504 (1987) may be employed to determine the interferometer phase. The computed phase difference is multiplied by $\lambda/\pi$ to calculate an absolute distance to the object 16 within an interval of size $\lambda/2$, the distance being relative to a reference point defined by the surface of the reference mirror 44. A figure profile of the surface of object 16 is generated by recording pairs of measurements and then translating the object 16 relative to the measurement beam 34. A linear translator 70 or similar means is coupled to the object 16 for this purpose.

The accuracy of the synthetic wavelength interferometer 14 is determined by the precision with which the phase can be measured and the details of the speckle pattern generated by the surface of the object 16. By comparing the synthetic wavelength measurement with conventional optical phase tracking of a smoothly translated object mirror, it has been determined that the apparatus of FIG. 1 has a phase-measurement accuracy of 1/1000.

Figure 2:
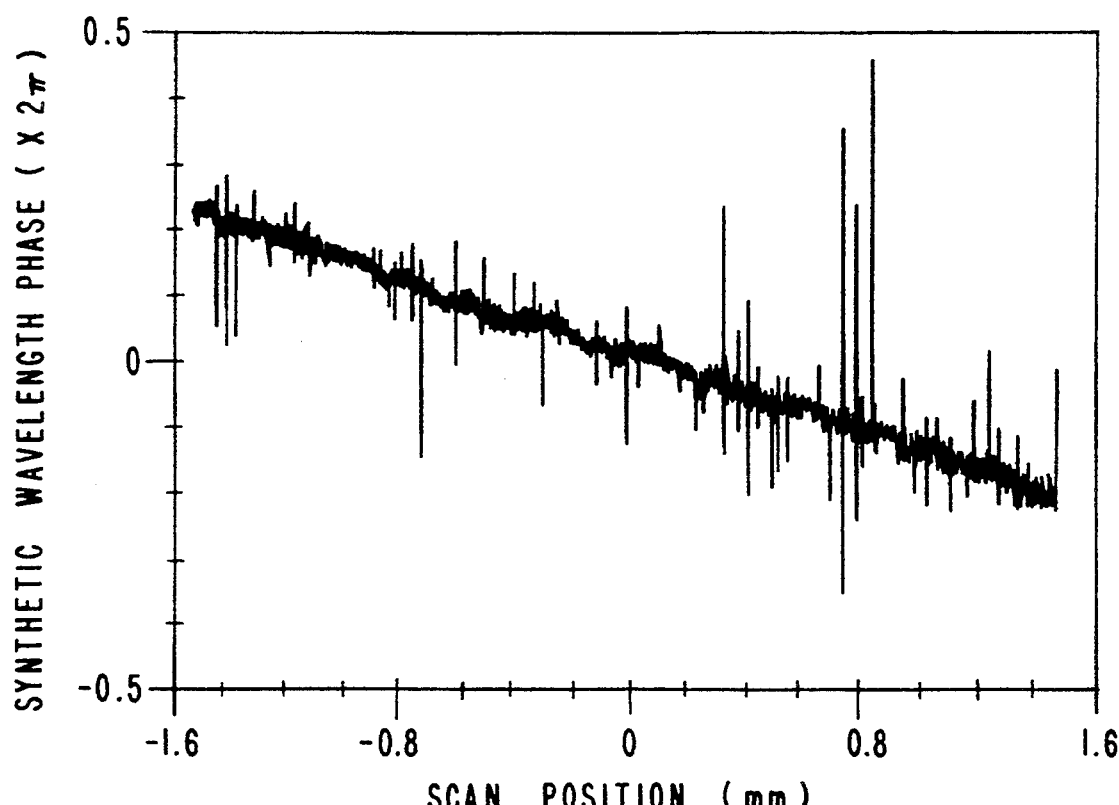
FIG. 2 is a graph depicting fringe-order data resulting from a difference in phase measurements at two different wavelengths using the apparatus of FIG. 1 and a fine-ground (5 micrometer) zerodur optical flat as an object surface.

FIG. 2 is a graph depicting fringe-order data resulting from a difference in phase measurements at two different wavelengths using the apparatus 10 of FIG. 1 and a fine-ground (5 micrometer) zerodur optical flat as the object 16. Analysis of the relative interferometric phase at the two wavelengths yields range information to the surface of the object 16.

It is noted from the scatter in the data plotted in FIG. 2 that for a 620 micrometer synthetic wavelength and a fine-ground (5 micrometer) optical flat speckle phenomena result in phase fluctuations much larger than 1/1000. It has been reported in the literature (U. Vry, Opt. Act., 33 1221 (1986)) that the amplitude of such fluctuations is strongly related to the strength of the interference signal, which varies dramatically as a rough surface is scanned. As a result, meaningful profile data is extracted from the phase information by first discarding weak-signal measurements corresponding to areas between bright lobes in the speckle pattern. The remaining data has been found to still contain some noise of high spatial frequency, but this high frequency noise may be reduced by an averaging technique. This averaging is performed over adjacent points in the data plot of FIG. 2 with the number of points being averaged together depending upon a desired RMS uncertainty and a maximum spatial frequency of the object 16 surface profile detail being measured. Multiplying the average obtained by a scaling factor equal to one half of the synthetic wavelength yields distance in micrometers.

Figure 3:
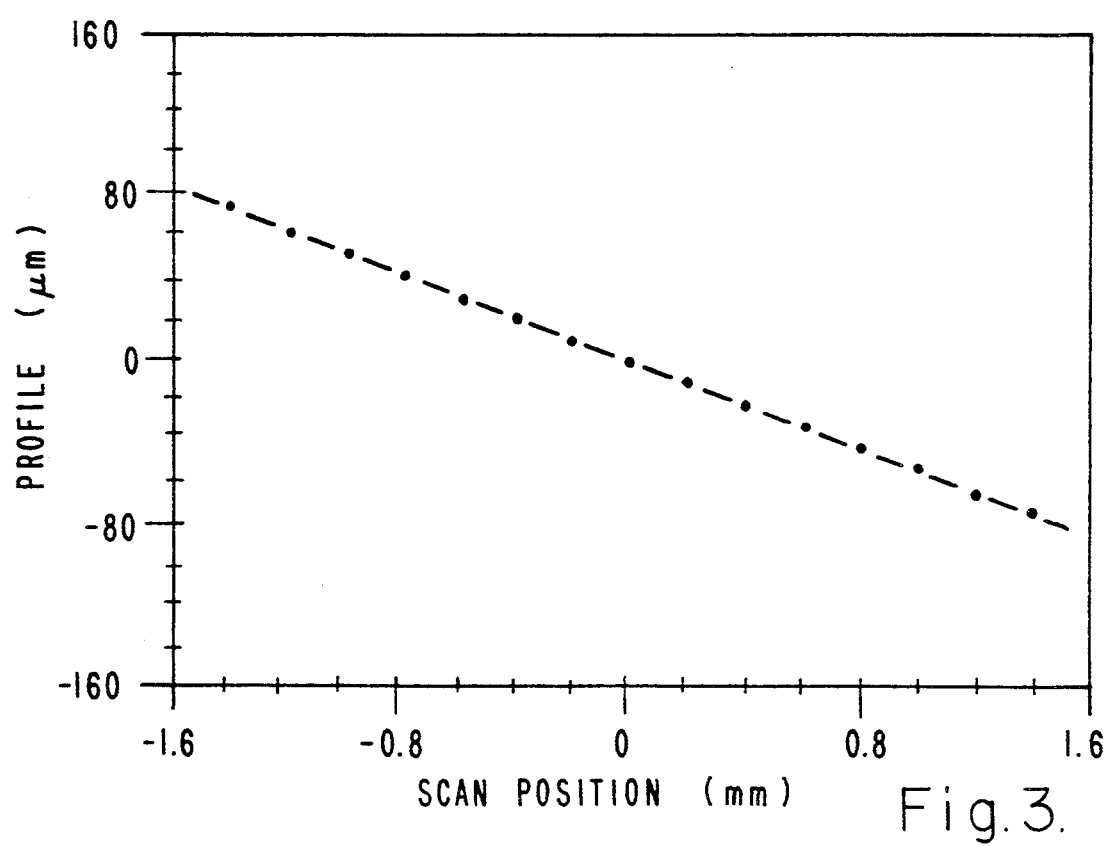
FIG. 3 is a graph depicting the result of processing the fringe-order data of FIG. 2 to reject data having a poor signal-to-noise ratio and to average the remaining data.

FIG. 3 is a graph depicting the result of processing the fringe-order data of FIG. 2 to reject data having a poor signal-to-noise ratio and averaging the remaining data. The processed profile information of FIG. 3 exhibits a maximum spatial frequency of 5 $mm^{-1}$ and an RMS variation, with respect to a least-squares linear fit, of 0.75 micrometers over an ambiguity interval of 310 micrometers. The plot of FIG. 3 clearly shows that the optical flat that served as the object 16 was tilted with respect to the scan direction.

The use of the present invention provides synthetic-wavelength point-scanning interferometry with an apparatus that has an approximately comparable complexity to a conventional interferometer. Furthermore, anticipated progress in laser diode device development is expected to even further broaden the applications for non-contact profiling and optical inspection using multiple wavelengths.

Although the present invention has been described in the context of specific wavelengths and optical components it should be realized that other wavelengths and more or less than the number of optical components shown in FIG. 1 may be employed, while yet obtaining the same result. Also, although the various lens systems are depicted as simple lens elements it should be realized that each may include a number of optical components to achieve the desired function. By example, the focusing lens system 62 may be a telescope. Thus, while the present invention has been particularly shown and described with respect to an embodiment thereof, it will be understood by those skilled in the art that changes in form and details may be made therein without departing from the scope and spirit of the invention.

What is claimed is:

1. Synthetic wavelength optical metrology apparatus for determining a characteristic of a surface, said apparatus comprising:

a multimode laser diode operable to emit a source beam including a range of stable wavelengths;

means for receiving the source beam to provide a phase modulated reference beam and a measurement beam, the measurement beam being focused to impinge on the surface;

means for combining the reference beam with the measurement beam reflected by the surface;

means for detecting, simultaneously at a plurality of wavelengths, a phase difference between the reference beam and the reflected measurement beam for determining a characteristic of the surface; and means for translating the surface with respect to the measurement beam such that a profile of the surface is determined.

2. Apparatus as set forth in claim 1 wherein the detecting means includes a single mode optical fiber for spatially filtering the combined reference beam and the reflected measurement beam and for directing the combined beams to a diffraction grating means for separating the combined beams into a plurality of beams each having an associated wavelength.

3. Apparatus as set forth in claim 2 and further including: a plurality of photodetectors individual ones of which being disposed for receiving one of the plurality of beams for measuring a beam intensity thereof; and means, coupled to an output of each of the plurality of photodetectors, for processing the output thereof to determine a displacement of the surface relative to a reference point.

4. Apparatus as set forth in claim 1 wherein the providing means includes a polarizing beam splitter disposed for receiving the source beam and for orthogonally polarizing the reference beam with respect to the measurement beam.

5. Apparatus as set forth in claim 1 further including a single mode optical fiber disposed for coupling the source beam to the providing means.

* * * * *